(12) United States Patent
Gremaud et al.

(10) Patent No.: US 8,347,114 B2
(45) Date of Patent: Jan. 1, 2013

(54) METHOD AND APPARATUS FOR ENFORCING A PREDETERMINED MEMORY MAPPING

(75) Inventors: Fabien Gremaud, Chatal-St. Denis (CH); Henri Kudelski, Chexbres (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 188 days.

(21) Appl. No.: 12/737,244

(22) PCT Filed: Jul. 27, 2009

(86) PCT No.: PCT/EP2009/059648
§ 371 (c)(1),
(2), (4) Date: Dec. 22, 2010

(87) PCT Pub. No.: WO2010/012678
PCT Pub. Date: Feb. 4, 2010

(65) Prior Publication Data
US 2011/0099387 A1    Apr. 28, 2011

(30) Foreign Application Priority Data
Jul. 28, 2008  (EP) ..................... 08161284

(51) Int. Cl.
*G06F 11/30* (2006.01)
(52) U.S. Cl. .................. 713/190; 713/189; 713/193
(58) Field of Classification Search .................. None
See application file for complete search history.

(56) References Cited

U.S. PATENT DOCUMENTS

| | | |
|---|---|---|
| 2002/0133701 A1 | 9/2002 | Lotspiech et al. |
| 2004/0128458 A1 | 7/2004 | Buhr |
| 2008/0288785 A1 | 11/2008 | Rao et al. |
| 2011/0082966 A1* | 4/2011 | Yu et al. .................. 711/103 |
| 2011/0131402 A1* | 6/2011 | Mittal .................. 713/2 |
| 2011/0142228 A1* | 6/2011 | Crispin et al. .................. 380/28 |

FOREIGN PATENT DOCUMENTS

| | | |
|---|---|---|
| WO | WO-02093387 A2 | 11/2002 |
| WO | WO-2005015818 A1 | 2/2005 |
| WO | WO-2007034184 A2 | 3/2007 |

OTHER PUBLICATIONS

Rogers, B.; Chhabra, S.; Solihin, Y.; Prvulovic, M.; , "Using Address Independent Seed Encryption and Bonsai Merkle Trees to Make Secure Processors OS- and Performance-Friendly," Microarchitecture, 2007. MICRO 2007. 40th Annual IEEE/ACM International Symposium on , vol., no., pp. 183-196, Dec. 1-5, 2007; year 2007.*

* cited by examiner

*Primary Examiner* — David Y Jung
(74) *Attorney, Agent, or Firm* — Harness, Dickey & Pierce, P.L.C.

(57) ABSTRACT

A system and a method are disclosed for enforcing a predetermined mapping of addresses in a physical address space to addresses in a virtual address space in a data processing system including a processor in the virtual address space and a memory in a physical address space. During the compilation and linking of an application to be run on the data processing system, in at least one embodiment, the mapping table is generated linking the virtual addresses to physical addresses. This mapping table is kept secret. A second mapping table is generated using a cryptographic function of the physical address with the virtual address as a key to link virtual addresses to intermediate addresses. The second mapping table is loaded into the memory management unit. The data processing system further includes cryptographic hardware to convert the intermediate address to the physical address using the inverse of the cryptographic function which was used to calculate the intermediate address.

15 Claims, 5 Drawing Sheets

METHOD AND APPARATUS FOR ENFORCING A PREDETERMINED MEMORY MAPPING

The present invention relates to the fields of cryptography and memory management in a data processing system. More particularly, the present invention addresses the problem of security in a memory management unit and provides a means for preventing a potential hacker from being able to use a memory management unit's contents to be able to predict a physical address from a given virtual address.

BACKGROUND OF THE INVENTION

A data processing system may include hardware resources such as a processing unit (CPU), volatile memory (RAM) and non-volatile memory (ROM). The data processing system may operate under the control of at least one operating system and may perform routines according to one or several software resources or applications. Modern data processing systems generally include a memory management unit (MMU) in order to be able to map addresses from a virtual address space to a physical address space. The physical address space is generally smaller than the virtual address space and it is with the judicial use of such a memory management unit that several processes may be run concurrently on the data processing system.

With the advent of multiple connectivity options for data processing systems, including wireless connectivity, and with the huge growth in the use of mobile data processing systems, the need to protect these systems from malicious attacks has become increasingly important. Malicious attacks can be aimed at interfering with system booting, modifying the operating system, intercepting and/or modifying data produced by or utilized by some application.

Indeed, it has now become a necessary requirement to protect data processing systems against fraudulent manipulations and attacks on their integrity. Such malicious attacks may come in the form of software designed to take over a data processing system's operating system or otherwise interfere with the normal processing sequence of the data processing system without the user's knowledge or approval. Such software is generally known as malware. The presence of malware in a data processing system is generally difficult to remedy and can lead to complete system failure or even to irreparable damage to the system.

Computer viruses, worms, Trojan horses, spyware etc. are all different types of malware. The different types of malware can attack the processing system in various ways such as by intercepting data which was meant for another application or by monitoring key strokes in order to steal passwords or other information which is meant to be kept secret, modifying or otherwise altering data or corrupting files, modifying a program in order to cause it to crash or to execute some function which was not originally intended by the user.

One of many ways in which the security of a data processing system may be compromised is via the system's memory management unit. A typical memory management unit maps addresses in a virtual address space to addresses in a physical address space. In some cases the mapping can be predictable. In other cases a user may be able to obtain the mapping from the MMU. In this way a potential hacker can use this information to store some previously written malicious code at a certain location in an appropriate place in the physical address space and cause the data processing system to jump to the location where the malicious code resides thereby disrupting the system in some way. Another possible way to modify the operation of a data processing system is to modify the mapping directly, such that the virtual address maps to a new physical address where the malicious software resides. It is the aim of the present invention to circumvent the possibility of a potential hacker being able to properly predict the mapping of the virtual address space to the physical address space.

PRIOR ART

An International Patent Application published under the Patent Cooperation Treaty as International Publication Number WO 2005/015818 A1 describes a system and a method for enhancing data security in a broad number of electronic systems through encryption and decryption of addresses in physical memory to which data is written and from which data is read. The system utilises encryption of addresses during write operations and decryption of addresses during read operations, provided the initiator of the read operation is correctly authenticated, i.e. by using a password, a key or other appropriate authentication means. The description refers to the use of adding an offset to an address to obtain the encryption and further mentions other encryption techniques such as address table look-up, left shift, right shift, barrel shift and address fragmentation. The system specifically comprises two separate devices, one for encrypting memory addresses during write operations and the other for decrypting addresses during read operations. The goal of the system described in the document is to prevent unauthorised access to the memory. Someone who cannot be authenticated, i.e. who does not have access to the key to descramble the addresses during read, will not be able to access data from the memory in a predictable fashion. The aim of the present invention on the other hand is to introduce a safeguard against the introduction of malicious code into a memory and the subsequent recall of the malicious code through corruption of the virtual to physical address mapping made within a memory management unit (MMU). The present invention therefore does not have to prevent an authorised user from reading from the memory. Rather, the present invention only professes to provide a means to enforce the intended mapping made within the MMU by providing a double check. If it can be assumed, as it is in the present invention, that a hacker can modify the mapping in the MMU, then the prior art as described in the referenced document will not counter such an attack.

Similarly, in an International Patent Application published under the Patent Cooperation Treaty as Publication Number WO 02/093387 A2, a method is described for protecting data transmission between a central processor and a memory, in which virtual addresses supplied by the processor are encoded with an unchangeable first key and then further encoded with a changeable second key thus giving physical addresses used to access the memory. The purpose of the method described is to limit the possible damage resulting in the discovery of the first key whereby all systems using the same encryption system would be compromised. This is achieved by adding a second, changeable key. In this way, when one system is compromised, it is sufficient to change the second key in all other such systems to render them once again secure, thus limiting the damage to the sole system whose security has been compromised. Again, this system is aimed merely at preventing unauthorised users form accessing the data in the memory whereas the present invention aims at enforcing the predetermined mapping between virtual and physical addresses, as described above.

SUMMARY OF THE INVENTION

The present invention provides a method for the enforcement of a predefined mapping of at least one virtual address to at least one physical address in a digital processing system comprising at least a processor and a memory, said processor using the virtual address to access the memory, said memory being accessed using the physical address, said enforcement method comprising the following steps:

generating the predefined mapping table comprising at least part of the virtual address and the corresponding physical address, calculating an intermediate address corresponding to said virtual address, said calculation using a cryptographic function of at least two parameters, said at least two parameters being said physical address and all or part of said virtual address, generating a second mapping table comprising the virtual address and its corresponding intermediate address, receiving a request to access the memory, said request comprising at least part of the virtual address, using the second mapping table to give the intermediate address corresponding to said at least part of the virtual address, generating the physical address corresponding to the intermediate address by using the inverse of the cryptographic function of at least two parameters, said at least two parameters being the intermediate address and all or part of the virtual address, accessing the memory using the physical address.

The invention further provides a system for enforcing said predefined mapping, said enforcement system comprising a second mapping table for mapping the virtual address to the corresponding intermediate address, said second mapping describing a first cryptographic function wherein the intermediate address is equal to the physical address encrypted under all or part of the virtual address, said enforcement system further comprising hardware to perform a second cryptographic function wherein the physical address is equal to the intermediate address encrypted under all or part of the virtual address, said second cryptographic function being the inverse of the first cryptographic function.

BRIEF DESCRIPTION OF THE DRAWINGS

The invention will best be understood by reference to the following detailed description of a preferred embodiment when read in conjunction with the accompanying drawings, wherein.

DETAILED DESCRIPTION OF A PREFERRED EMBODIMENT

In view of the problems described above with respect to typical memory management units (MMU) within data processing systems, the present invention provides a system and a method for obfuscating the mapping of a virtual address space to a physical address space by providing an intermediate address space. The intermediate address space is a cryptographic function of the physical address space and the virtual address space. In this way, any possible attempt to compromise the security of such a data processing system by modifying the mapping of the virtual address space (VAS) to the physical address space (PAS) is thwarted since the creation of the intermediate address space (IAS) provides a means for enforcing the predetermined relationship between the virtual address space (VAS) and the physical address space (PAS).

Figure 1:
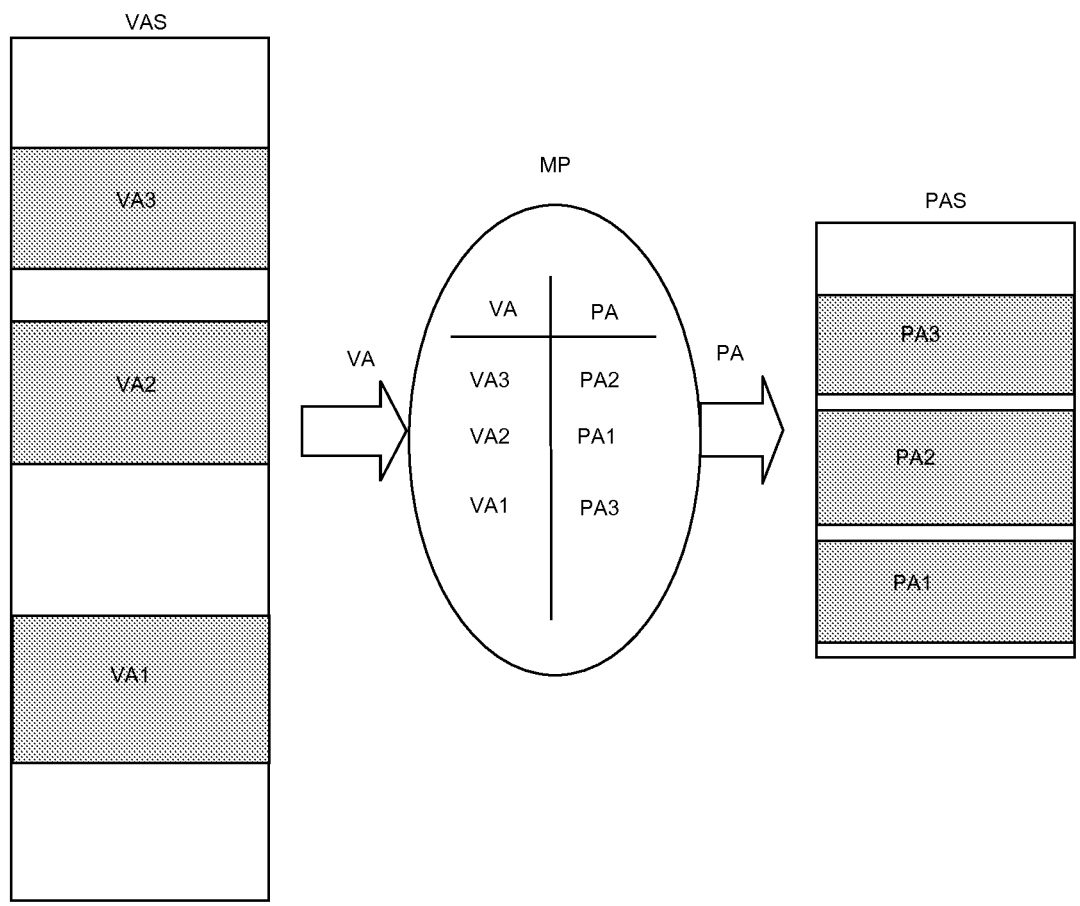
FIG. 1 shows an example representative of the current state of the art wherein several addresses (VA) corresponding to addressable entities (M1, M2, M3) in a virtual address space (VAS) are mapped (MP) to corresponding addresses (PA) in a physical address (PAS).
Figure 2:
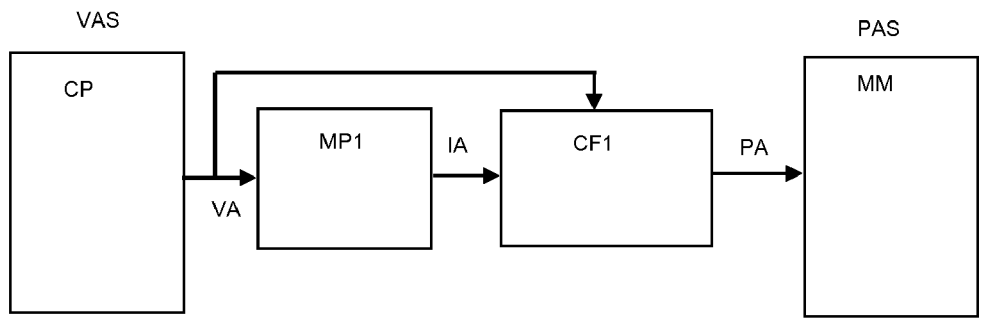
FIG. 2 shows an embodiment of the present invention.

The method used in the present invention applies to a data processing system comprising (FIG. 2) a processor unit (CP) in a virtual address space (VAS) and a memory (MM) in a physical address space (PAS). The data processing system further comprises a means for mapping addresses (MP1) from the virtual address space to an intermediate address space (IAS) and hardware for realizing a cryptographic function (CF1) based on two parameters, those two parameters being an intermediate address (IA) and a virtual address (VA). The hardware for realizing the cryptographic function (CF1) converts addresses from the intermediate address space to addresses in the physical address space. The means for mapping addresses (MP1) will usually be comprised in a memory management unit (MMU), said means generally being in the form of a mapping table.

Figure 3:
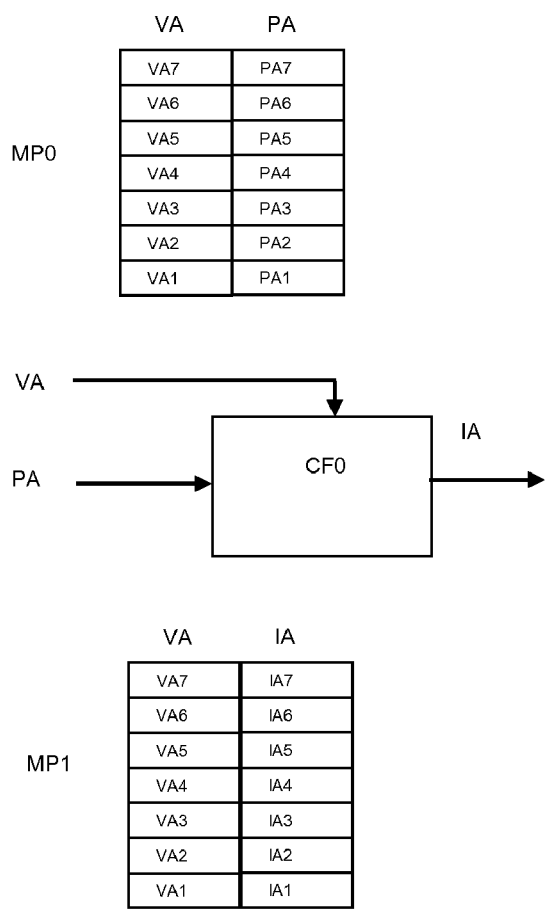
FIG. 3 shows the method used in the present invention for calculating the intermediate address.

The calculation of the intermediate addresses is a two step process (FIG. 3). The first step is to generate a first mapping table (MP0), known as a predetermined mapping table, where virtual addresses are mapped to physical addresses. This is usually part of the normal processes involved in compiling, linking and mapping an application—the process is known as dynamic address translation. The second step is to generate a second mapping table (MP1) where virtual addresses are mapped to intermediate addresses, said intermediate addresses being calculated using a cryptographic function (CF0) of the virtual addresses (VA) and their corresponding physical addresses (PA), where CF0 is the inverse of the cryptographic function CF1 i.e. the inverse of the cryptographic function which is carried out by hardware in the data processing system. According to an embodiment of the present invention, the cryptographic function is applied to the physical address and the virtual address is used as a key.

In order to prevent a potential hacker from gaining knowledge of the link between virtual and physical addresses thereby having the knowledge to effectively introduce malicious code, the memory management unit does not contain any information linking virtual addresses to physical addresses. Instead, the memory management unit merely maps virtual addresses to intermediate addresses. Indeed, according to an embodiment of the present invention, the calculation of the intermediate addresses, using the predetermined mapping table of virtual and physical addresses, is done outside of the data processing system, for example in a remote management centre. The thus generated second mapping table linking the virtual addresses to the intermediate addresses is then loaded into the data processing system's memory management unit and the compiled, linked and mapped application is loaded into the appropriate place in the data processing system's memory.

In one embodiment of the present invention only part of the virtual address may be used as the key to the cryptographic function. This allows for a reduction in the entropy of the result of the cryptographic function. For example, only the lower or higher 16 bits can be used for the cryptographic function.

The data processing system comprises cryptographic hardware to realize the cryptographic function CF1 (the inverse of CF0, the cryptographic function which was used to calculate the intermediate addresses). When the processor unit needs to access a part of the memory, the processor unit issues a current virtual address corresponding to the part of the memory to be accessed. The current virtual address is mapped to a current intermediate address using the second mapping table in the MMU and the current intermediate address is converted to a current physical address using the cryptographic hardware applied to the current intermediate address and the current virtual address. The memory module is then accessed using the thus calculated current physical address.

The cryptographic function could be an encryption, with the inverse of the cryptographic function being a decryption. Conversely, the cryptographic function could be a decryption with the inverse of the cryptographic function being an encryption. Other functions can be used such as an XOR function.

According to an embodiment, the encryption function is a proprietary function having parameters specific to the application for which it is intended, e.g. in IDEA Nxt, the substitution (SBox) table will be specific for this application.

The present invention therefore provides a double-check mechanism or an enforcement mechanism such that once the mapping of virtual addresses to physical addresses has been decided upon, no further modification is possible. The mapping of virtual to physical addresses is decided off-chip; the decision is recorded by encrypting the physical addresses under their corresponding virtual addresses to provide intermediate addresses; the link between the virtual and the intermediate addresses is provided on-chip in the form of a mapping table; hardware means to reverse the encryption are provided on-chip to convert the intermediate addresses back to physical addresses using the corresponding virtual address as a key, thus enforcing the previously decided mapping from virtual addresses to physical addresses. Any attempt made by a hacker to modify an intermediate address will therefore lead to an unpredictable physical address since only the correct intermediate address, corresponding to the virtual address which is used as a key, will decrypt to give the desired physical address.

The addresses referred to in the present invention relate to a range of addresses in an address space. Indeed a given address is in fact a pointer to the beginning of a range of consecutive addresses, said range being a page or a plurality of pages or a segment etc. For example a 4 kilobyte random access memory (RAM) has a virtual address of 7000H and therefore occupies a virtual address range of 7000H to 7FFFH. A page within the RAM, comprising a predefined number of bytes of digital information has a virtual address of 7400H. The page of the RAM may be mapped to a physical address of 2400H for example. The intermediate address of the page of RAM would be calculated as a cryptographic function of 2400H and 7400H giving say 9132H. When referring to a location within the page of RAM by its virtual address of say 7410H, this would give a corresponding intermediate address of 9132H plus an offset of 0010H i.e. 9142H.

Figure 4:
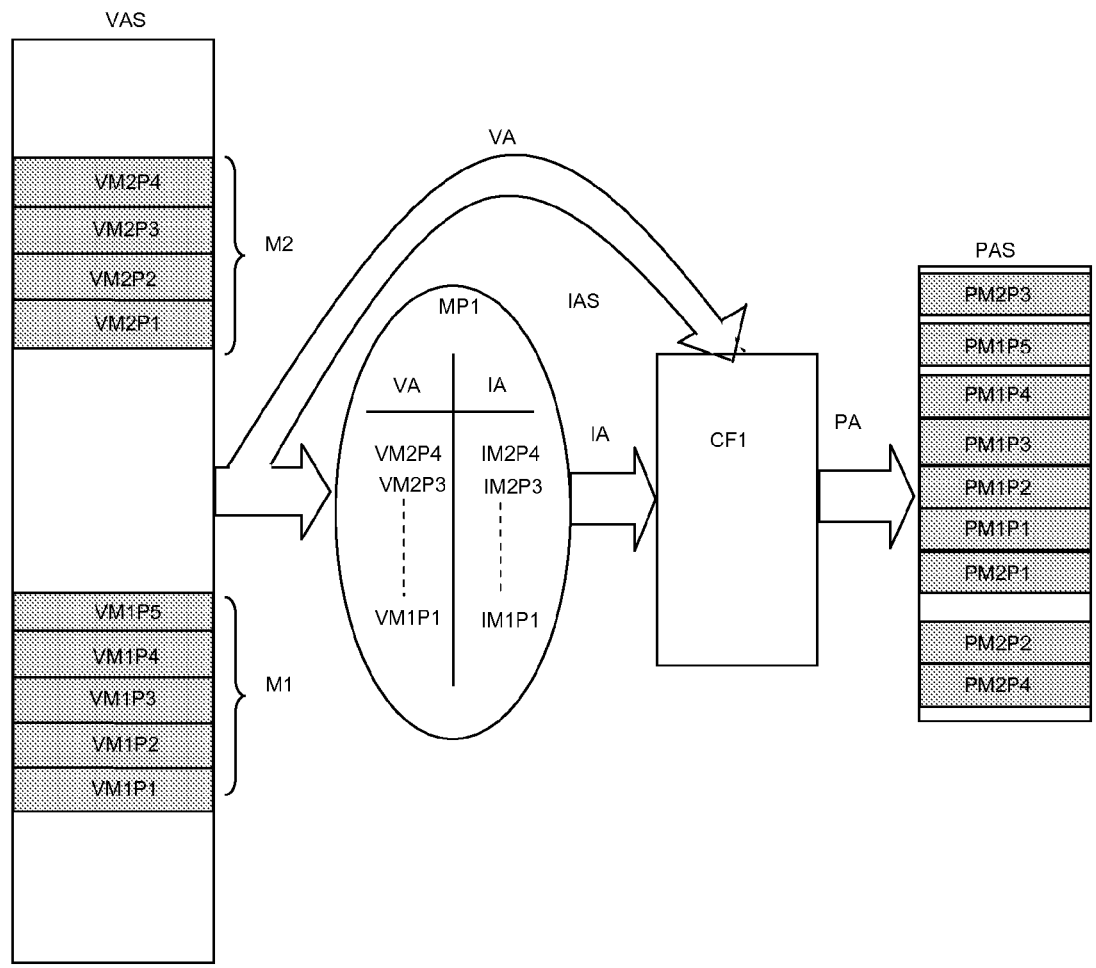
FIG. 4 shows a detailed view of an embodiment of the present invention illustrating the mapping of pages from a virtual address space to pages in a physical address space.

FIG. 4 illustrates an embodiment of the present invention in more detail. Two memories (M1, M2) comprise a plurality of pages, said pages having virtual addresses VM1P1 through VM1P5 and VM2P1 through VM2P4. A mapping table (MP) has been loaded which links the virtual addresses (VA) of pages in the virtual address space (VAS) to intermediate addresses (IA) of pages in the intermediate addresses space (IAS). The cryptographic function (CF1) is applied to the intermediate addresses using the corresponding virtual addresses as keys to give physical addresses (PA). Each page in the virtual address space (VMnPm) is thus mapped to a page in the physical address space (PMnPm) in a secure manner since knowledge of either or both of virtual addresses or intermediate addresses does not allow for a third party to predict physical addresses.

Figure 5:
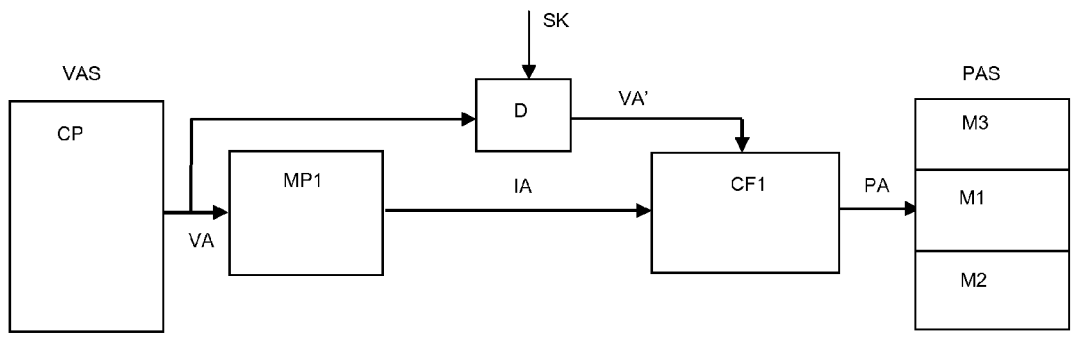
FIG. 5 shows an embodiment of the present invention where a software key is used as a third parameter in the cryptographic function used to calculate the physical address.

In yet another embodiment of the present invention, a further level of security could be added by introducing a software key. In this embodiment, the management centre determines the intermediate address by a cryptographic function of the virtual address, the physical address and the software key. In the data processing system, the physical address is the inverse cryptographic function of the virtual address, the intermediate address and a software key corresponding to the aforementioned software key. FIG. 5 shows an example of a practical application of such a scheme, whereby a software key (SK) is used to diversify (D) the virtual address (VA) before applying the cryptographic function (CF1) to the intermediate address (IA) using the diversified virtual address (VA') as a key. In this case, the intermediate address would have been generated from the inverse of the cryptographic function (CF0) applied to the physical address and the virtual address diversified by a corresponding software key.

Figure 6:
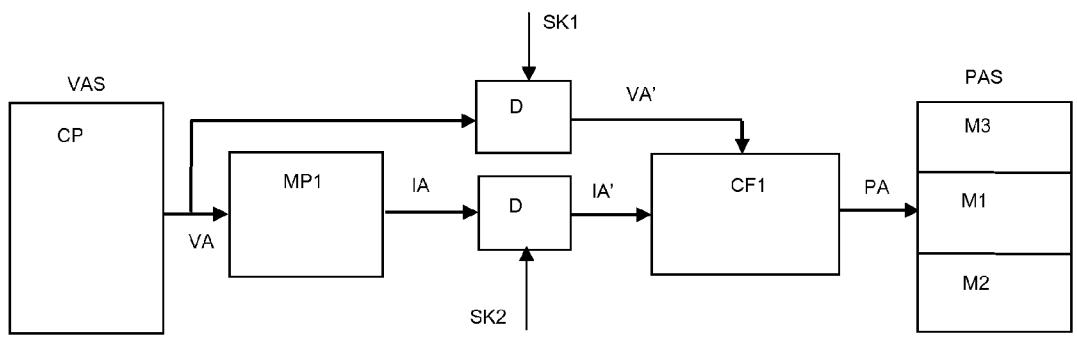
FIG. 6 shows a further embodiment of the present invention using the software key applied at different places.

The above description refers to one example with the use of a software key. In another embodiment the software key could be used to diversify the intermediate address instead of the virtual address. In yet another embodiment a plurality of software keys could be used. FIG. 6 shows an example wherein a first software key (K1) is used to diversify (D) the virtual address while a second software key (K2) is used to diversify the intermediate address. The first and second software keys could be the same key. An example of a diversifying function as mentioned above could be a simple XOR function, an encryption scheme such as DES or any cryptographic function.

The software key can of course be bypassed when desired. This would be useful for example if there were a requirement to add a layer of security in software, which would be bypassed under normal circumstances and switched on whenever the integrity of the cryptographic hardware has been compromised, at which times the software key would be used to execute the software security layer.

The software key can be stored in a volatile memory so that at each power-on, the security software, or part of the software zone, is not accessible until the software key is loaded. The switching on or off of the software key can be managed directly by the virtual address, i.e. some of the bits of the virtual address can enable or disable the diversifying function (D). As a consequence, the program in charge of waiting for the software key (in a suitable message) will reside in a zone for which the software key is disabled. The other memory zones are automatically software key enabled so that if the processor tries to access these zones without having loaded the software key, the intermediate address will be wrong. The message containing the software key can be encrypted by a unique key pertaining to the memory management unit, or a global key pertaining to the data processing system.

Figure 7:
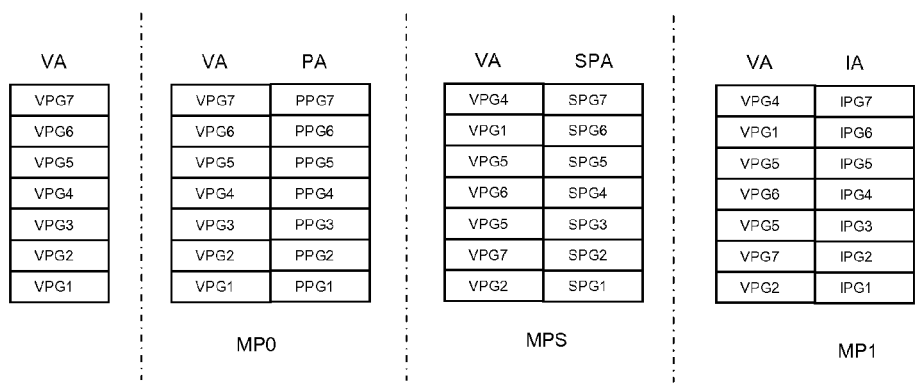
FIG. 7 shows an example of scrambled mapping of pages as applied to the present invention.

To prevent the possibility of a hacker being able to reconstitute information obtained from a memory dump, especially in the case where a segment of the physical address space is mapped to a ROM, the pages within the address range of the ROM may be scrambled (FIG. 7). This is done after the ROM physical address range is generated by the compiler at the management center by such known means such as a pseudo random function to give the predetermined mapping (MP0). An additional step of splitting the ROM range into pages is carried out and the pages are scrambled while keeping track of the virtual address related for each page. The scrambling function could be random, pseudo random or initialized by a key.

Now taking into account the new physical address for a given virtual address, a scrambled predetermined mapping table is generated (MPS). This scrambled predetermined mapping table (MPS) is then used to generate the second mapping table (MP1) according to the explanations given above.

Figure 8:
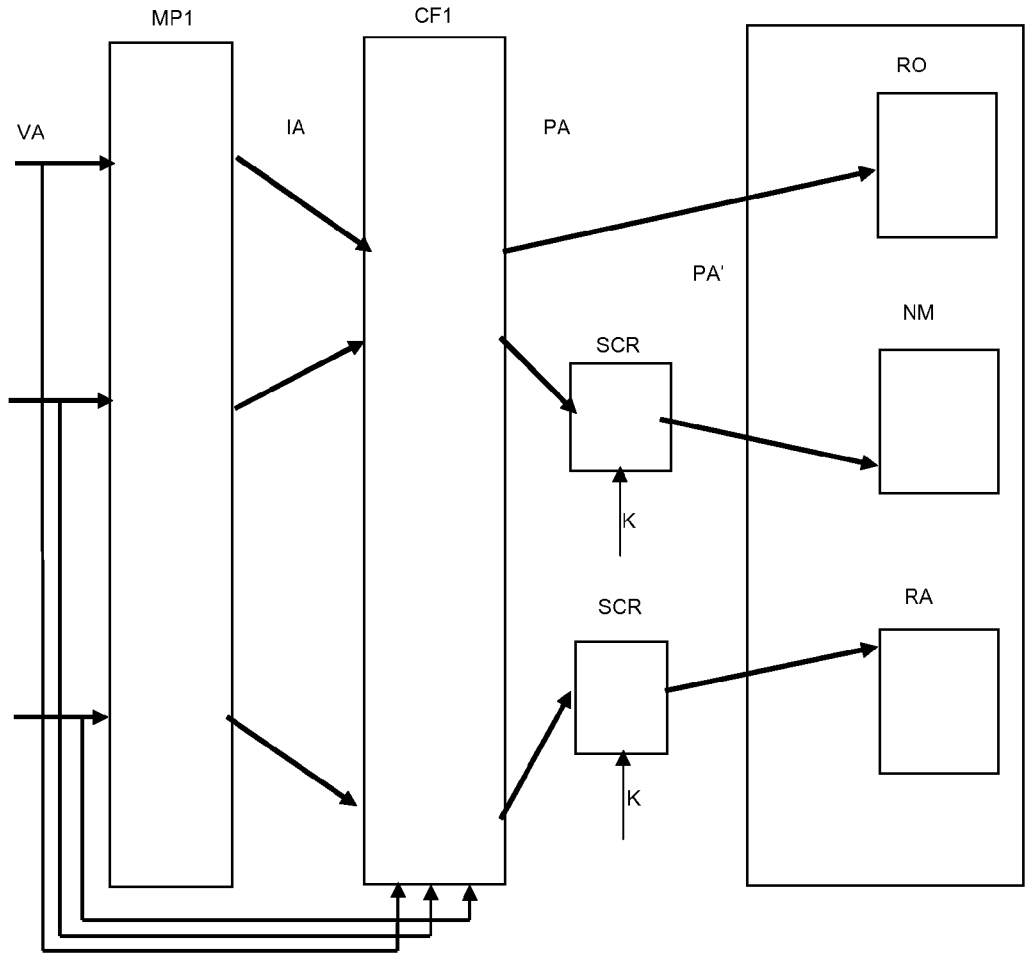
FIG. 8 shows an embodiment of the present invention wherein a second cryptographic function is used to further scramble some of the physical addresses.

In another embodiment of the present invention (FIG. 8) a second cryptographic hardware (SCR) is used to scramble the physical addresses (PA) at the output of the first cryptographic hardware (CR). This scrambling could be done for parts of the memory which would be written to and read from, for example parts of the memory where random access memory (RA) or read/writable non-volatile memory (NM) etc is mapped. Furthermore, different types of key (K) for the second cryptographic function could be used, for example a key which is stored at the time of manufacture in a non-volatile memory or on the other hand a key which can change between system resets.

The invention claimed is:

1. Method for enforcing a predefined mapping of at least one virtual address to at least one physical address in a digital processing system comprising at least a processor and a memory, said processor using the virtual address to access the memory, said memory being accessed using the physical address, said enforcement method comprising the following steps:
    generating the predefined mapping table comprising at least part of the virtual address and the corresponding physical address,
    calculating an intermediate address corresponding to said virtual address, said calculation using a cryptographic function of at least two parameters, said at least two parameters being said physical address and all or part of said virtual address,
    generating a second mapping table comprising the virtual address and its corresponding intermediate address,
    receiving a request to access the memory, said request comprising at least part of the virtual address,
    using the second mapping table to give the intermediate address corresponding to said at least part of the virtual address,
    generating the physical address corresponding to the intermediate address by using the inverse of the cryptographic function of at least two parameters, said at least two parameters being the intermediate address and all or part of the virtual address,
    accessing the memory using the physical address.

2. Method according to claim 1, comprising the cryptographic function is an encryption of a parameter by a key, said parameter being the physical address and said key being all or part of the virtual address.

3. Method according to claim 1, comprising the cryptographic function is a decryption of a parameter by a key, said parameter being the physical address and said key being all or part of the virtual address.

4. Method according to claim 1, comprising at least part of the virtual address is used to address a range of consecutive addresses in the physical address space, said range of consecutive addresses being known as a page, said predetermined mapping table comprising a virtual address of at least one page and a corresponding physical address of said page.

5. Method according to claim 4, comprising said pages are scrambled while keeping trace of the virtual address related to each page, the pair of virtual and physical addresses in a scrambled predetermined mapping table being generated using the virtual address and the scrambled physical address, said scrambled predetermined mapping table being used to generate the second mapping table.

6. Method according to claim 5, comprising the at least part of the virtual address space maps to a read-only memory containing a program.

7. Method according to claim 5, comprising it further comprises the step of scrambling the physical address using a further cryptographic function of at least part of the physical address and a scramble key, said scrambled physical address being used to access a volatile memory.

8. Method according to claim 7, comprising the scramble key is stored in a non-volatile memory.

9. Method according to claim 7, comprising the scramble key is changed frequently.

10. Method according to claim 1, comprising the inverse of the cryptographic function is realized in hardware.

11. Method according to claim 1, comprising the predetermined mapping table and the second mapping table are generated remotely from the data processing system and the second mapping table is loaded into a memory management module local to the data processing system.

12. Method according to claim 1, comprising:
    using at least one software key as a further parameter in the cryptographic function, said further parameter being used to diversify all or part of the virtual address and/or the physical address, and
    using the at least one further software key as a further parameter in the inverse cryptographic function, said further parameter being used to diversify all or part of the virtual address and/or the intermediate address.

13. System for enforcing a predefined mapping of a virtual address to a physical address in a digital processing system comprising at least a processor and a memory, said processor using the virtual address to access the memory, said memory being accessed using the physical address, said enforcement system comprising:
    a second mapping table for mapping the virtual address to a corresponding intermediate address, said second mapping describing a first cryptographic function wherein the intermediate address is equal to the physical address encrypted under all or part of the virtual address; and
    hardware to perform a second cryptographic function wherein the physical address is equal to the intermediate address encrypted under all or part of the virtual address, said second cryptographic function being the inverse of the first cryptographic function.

14. System according to claim 13, comprising the second cryptographic function is realised in hardware.

15. System according to claim 13, comprising a further cryptographic module is used to further scramble the physical address to give a scrambled physical address using a key which is unique to said system.

* * * * *